(12) United States Patent
Fukushima et al.

(10) Patent No.: US 6,476,997 B2
(45) Date of Patent: Nov. 5, 2002

(54) DISK DEVICE, TRACK POSITIONING METHOD AND METHOD FOR GENERATING A POSITION ERROR SIGNAL

(75) Inventors: Yukio Fukushima, Tokyo-to; Tetsuo Ueda, Sagamihara; Toshio Kakihara, Fujisawa; Hideo Asano, Machida, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/120,906

(22) Filed: Jul. 22, 1998

(65) Prior Publication Data

US 2001/0036032 A1 Nov. 1, 2001

(30) Foreign Application Priority Data

Jul. 22, 1997 (JP) .............................................. 9-195545

(51) Int. Cl.⁷ .............................................. G11B 5/596
(52) U.S. Cl. ................................ 360/77.08; 360/77.05; 360/53
(58) Field of Search .......................... 360/77.08, 77.07, 360/77.02, 77.05, 53, 75

(56) References Cited

U.S. PATENT DOCUMENTS 5,798,883 A * 8/1998 Kim ............................. 360/31
6,005,739 A * 12/1999 Yun ......................... 360/77.04

FOREIGN PATENT DOCUMENTS

| JP | 63-15372 | 12/1986 | | |
|---|---|---|---|---|
| JP | 63-237270 | 3/1987 | | |
| JP | 2-141916 | 11/1988 | | |
| JP | 401271981 A | * 10/1989 | | 21/10 |
| JP | 5-62393 | 8/1991 | | |
| JP | 6-349214 | 12/1994 | | |
| JP | 6-349214 A | 12/1994 | | |
| JP | 10-269730 | 10/1998 | | |
| JP | 10269730 A | * 10/1998 | | G11B/20/12 |

* cited by examiner

*Primary Examiner*—David Hudspeth
*Assistant Examiner*—Dau I. Davidson
(74) *Attorney, Agent, or Firm*—Altera Law Group, LLC

(57) ABSTRACT

A disk device, track positioning method, and method for generating a position error signal in which the occurrence of a wrong correction operation can be prevented by creating an appropriate PES without using a burst pattern having a defect, and reassign sectors can be decreased by decreasing defective sectors thereby to reduce the performance degradation is disclosed. In the disk device and track positioning method, the defect of a burst pattern read out from a disk is detected, and if a defect is detected in the burst pattern, a data value corresponding to the sum data of the burst pattern pair having the defect detected is obtained by measuring the maximum amplitude value of the burst pattern pairing with the burst pattern having the defect detected, and a PES is created according to the amplitude of the burst pattern having the defect detected and the maximum amplitude value.

20 Claims, 8 Drawing Sheets

Fig. 9A (Prior Art)

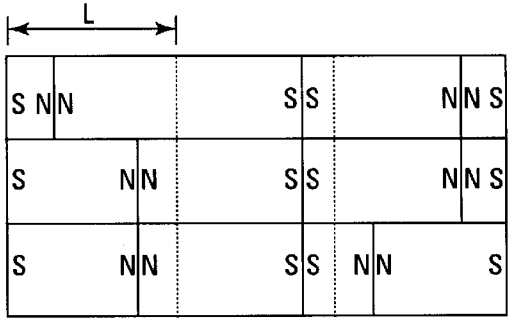

|  | Gray code | Binary track address |
|---|---|---|
| Identifying information of data track N | 100 | 111 |
| Identifying information of data track N+1 | 000 | 000 |
| Identifying information of data track N+2 | 001 | 001 |

Fig. 9B (Prior Art)

Read signal obtained when head passes identifying information recording area of data track N

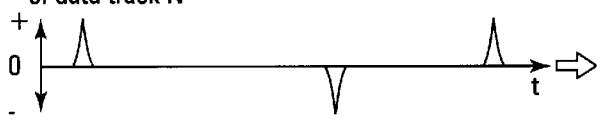

Gray code: 100  Binary: 111

Fig. 9C (Prior Art)

Read signal obtained when head passes identifying information recording area of data track N+1

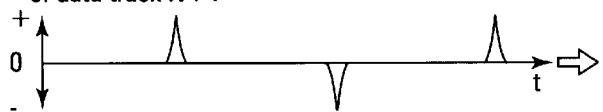

Gray code: 000  Binary: 000

Fig. 10 (Prior Art)

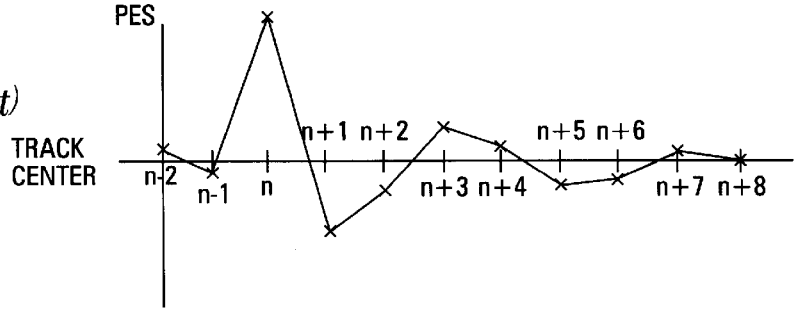

DISK DEVICE, TRACK POSITIONING METHOD AND METHOD FOR GENERATING A POSITION ERROR SIGNAL

BACKGROUND OF THE INVENTION

1. Field of the Invention

The present invention relates to a disk device, a track positioning method, and a method for generating a position error signal which are used in a hard disk drive (HDD) or the like, and particularly to a disk device, a track positioning method, and a method for generating a position error signal in which a magnetic head is positioned at the center of a target track.

2. Description of Related Art

In the hard disk drive (HDD) which is used as an external storage device for information processing systems, more size reduction and higher reliability are demanded. In the conventional hard disk, data tracks are concentrically formed. A reading or writing of information to the magnetic disk is performed after a seek operation, that is, after rotating the magnetic disk and moving the magnetic head substantially radially of the magnetic disk to position the magnetic head at a specific data track. The positioning of the magnetic head at a specific data track is performed by using the magnetic head to respectively read head position identifying information and burst patterns which are prerecorded on the magnetic disk.

FIG. 7 is a figure schematically showing the data areas and the servo areas of a magnetic disk. As shown in FIG. 7, data areas 11 and servo areas 12 are separately formed in a magnetic disk 10, and a magnetic head identifies the position according to the servo data recorded in these servo areas 12, and writes data to the data area at a desired position, or reads it.

FIG. 8 is a figure showing part of the head position identifying information and burst patterns which are recorded on the magnetic disk. In FIG. 8, the magnetic disk rotates along the circumferential direction (the direction of arrow F in FIG. 8), and the magnetic head, not shown, moves along substantially the radial direction of the magnetic disk (the direction of arrow G in FIG. 8). Concentrically formed in the magnetic disk are a plurality of data tracks 20A, 20B, 20C, . . . on which data are recorded. Data tracks are arranged along the circumferential direction, and between the adjacent data tracks, an identifying information recording area 21 and a burst pattern recording area 22 are formed.

The cylinder (CYL) and sector (SEC) position information, which is information for identifying the head position, is contained in the gray code (cyclic binary code) in the identifying information recording area 21. Following the gray code, the burst pattern recording area 22 for providing a fine adjustment signal for the track at the head position is recorded on the disk. By reading these servo data, the magnetic head is positioned at a desired track.

Each data track is previously provided with a track address for identifying itself. Recorded in the identifying information recording area 21 is identifying information of a predetermined number of bits which is representing the track address of the corresponding data track by a gray code. Also recorded in the burst pattern recording area 22 is a plurality of (in FIG. 8, four) burst pattern rows 22A, 22B, 22C, and 22D in which regions having a signal recorded therein (refer to the hatching in FIG. 8) are respectively arranged along the radial direction of the disk.

When the magnetic head is positioned at a desired data track, the track address of a data track which the magnetic head is facing is calculated according to an identifying information read signal, which is outputted from the magnetic head each time the head crosses the identifying information recording area 21.

FIGS. 9(A)–(C) illustrate the use of the gray code in the magnetic disk. FIG. 9(A) illustrates the identifying information, wherein the record length for one-bit data (L in FIG. 9(A)) is predetermined. According to whether the value of each bit of the gray code representing a track address is "0" or "1," the recording is made so as to make different the positions of the portions to be magnetized to N or S in a recording region of the length L which is corresponding to each bit.

For instance, if the magnetic head passes the identifying information recording area of a data track N shown in FIG. 9(A), a pulse is generated at a portion magnetized to N or S as shown in FIG. 9(B). Further, if the magnetic head passes the identifying information recording area of a data track N+1 shown in FIG. 9(A), a pulse is generated at a portion magnetized to N or S as shown in FIG. 9(C).

Based on the positions of the pulses of these identifying information read signals, the value of the gray code recorded in the identifying information recording area can be determined, and a track address can be obtained by converting the determined gray code to a binary code. For instance, a gray code (100) is determined from the pulse train of FIG. 9(B), and a binary code (111) is obtained through the conversion of the gray code. Further, a gray code (000) is determined from the pulse train of FIG. 9(C), and a binary code (000) is obtained through a further conversion of this gray code.

If it is determined that the magnetic head has reached the target data track, a position detection signal the level of which linearly varies according to the magnetic head position is generated by analyzing the sum of a plurality of signals obtained by respectively reading the plurality of burst pattern rows in the burst pattern recording area 22. Based on the position detection signal, the magnetic disk is positioned so that the gap of the magnetic head is positioned at the center of the width of the target data track.

As described above, in the sector servo type magnetic disk device, a seek operation is performed for moving the magnetic head onto a target track on the magnetic disk. In the seek operation, there is a speed control in which the servo data prerecorded on the magnetic disk is read out by the magnetic head and the magnetic head is moved to the target track on the magnetic disk according to the servo data that has been read out. There is a further speed control in which, when the magnetic head approaches the target track, the magnetic head is moved to the target track based on the burst pattern read out by the magnetic head. Further, there is a tracking control for positioning the magnetic head at the center of the target track. In addition, also in the tracking control, by moving the magnetic head according to the burst pattern detected by the magnetic head from the target track on the magnetic disk, the magnetic head is positioned at the center of the target track on the magnetic disk. That is, a tracking control is performed in which, if an off-track occurs in the magnetic head, the displacement is corrected to provide on-track control.

However, in the above magnetic disk device, if the magnetic layer formed on the magnetic disk surface peels off or dust is deposited when the magnetic layer is formed, the particular portion easily develops a defect as data is recorded with a high density. If such defect occurs in the recording area of a burst pattern, which is position information for obtaining the positional displacement of the magnetic head from the center of a track, the burst pattern is not correctly read by the magnetic head. As a result, the magnetic head may be determined to be off the center of the target track, when in fact the magnetic head is on the center of the track.

In the above HDD (Hard Disk Drive) using sector servo, if there is a defect in a burst pattern for creating a PES (Position Error Signal) which is the position information of the servo, the servo will perform a wrong correction operation according to the incorrect PES. Accordingly, if there is a defect in a burst pattern, this is handled as a defective sector. This defective sector is reassigned to a different place and written there. However, since the number of sectors that can be reassigned is limited and a seek operation must be performed, a reduction in the performance of the HDD results.

FIG. 10 is a figure for explaining the case in which the servo performs a wrong correction operation according to an incorrect PES if there is a defect in a burst pattern. In FIG. 10, n−2, n−1, n, n+1, . . . represent servos, and is assumed that there is a defect in a burst pattern at the servo n. Then, at the servo n, the PES is incorrectly made, and as shown in FIG. 10, the PES has a value that is significantly different than the preceding servos n−1 and n−2. Thus, an off-track operation occurs in the read/write head, and several servo sectors are required to perform an operation for correcting the position to the center of the track, as shown in FIG. 10. In the current HDD, since a plurality of data sectors exists in one servo sector as the storage capacity becomes larger, a large amount defective sectors occur. But as mentioned above, the defective sectors may be reassigned to different places within limits, but since seek operations must be performed, the performance of the HDD degrades.

Conventionally, if there is such a defect in a burst pattern, a technique has been taken in which the PES obtained from that burst pattern is not used, and a dummy PES as if there is no change in speed and position is used to prevent a wrong correction operation from being caused. However, in such conventional method using a dummy PES, the correct position and speed are not known since the PES obtained from the burst pattern having a defect is not used. Thus, a wrong data can be read out, or an off-track data writing can be performed to destroy the data in the adjacent track.

It can be seen then that there is a need for a disk device, a track positioning method, and a method for generating a position error signal, in which a wrong correction operation can be prevented by creating an appropriate PES without using a burst pattern having a defect.

It can also be seen that there is a need for a method that decreases the reassigment of sectors to prevent performance degradation by decreasing defective sectors.

SUMMARY OF THE INVENTION

To overcome the limitations in the prior art described above, and to overcome other limitations that will become apparent upon reading and understanding the present specification, the present invention discloses a disk device, a track positioning method, and a method for generating a position error signal in which a magnetic head is positioned at the center of a target track.

The disk device of the present invention is a disk device in which a position error signal is generated using burst patterns read out from a disk in which at least a pair of burst patterns are recorded on each of a plurality of tracks, and a head is positioned at a desired track according to the position error signal, characterized by comprising a defect detector for detecting the defect of a burst pattern read out from the disk, and a PES generator, when a defect is detected in the burst pattern by the defect detector, that generates the position error signal by using a burst pattern other than the burst position having the defect detected.

The disk device of the present invention is a disk drive in which a position error signal is generated using burst patterns read out from a disk in which at least a pair of burst patterns are recorded on each of a plurality of tracks, and a head is positioned at a desired track according to the position error signal, including a defect detector for detecting the defect of a burst pattern read out from the disk, and an amplitude detector for measuring the maximum amplitude value of a burst pattern other than the burst pattern having the defect detected, and a PES generator for generating the position error signal according to the maximum amplitude value when a defect is detected in the burst pattern by the defect detector.

The disk device of the present invention is a disk device in which a position error signal is generated using burst patterns read out from a disk in which at least a pair of burst patterns are recorded on each of a plurality of tracks, and a head is positioned at a desired track according to the position error signal, including a defect detector for detecting the defect of a burst pattern read out from the disk, and an amplitude detector for measuring the maximum amplitude value of the burst pattern pairing with the burst pattern having the defect detected, and a PES generator for generating the position error signal according to the maximum amplitude value when a defect is detected in the burst pattern by the defect detector.

An aspect of the present invention is that, when a defect is detected in the burst pattern by the defect detector, a data value corresponding to the sum data of the burst pattern pair having the defect detected is obtained by measuring the maximum amplitude value of the burst pattern pairing with the burst pattern having the defect detected, and the position error signal is generated according to the maximum amplitude value.

The defect detector may be the one which compares the amplitude of a burst pattern with the amplitude of the corresponding preceding burst pattern, and detects the defect of the burst pattern according to the comparison result. Further, the above maximum amplitude value may be a maximum value obtained when the head passes in the vicinity of the center of the burst pattern.

The above disk device may be the one which further includes a drive for driving the head onto the disk, wherein the maximum amplitude value is measured by causing the head to track the center of the burst pattern.

The position error signal after the detection of the defect of the burst pattern is generated according to the amplitude of a burst pattern other than the burst pattern having the defect detected, and the measured maximum amplitude value.

The track positioning method of the present invention is a track positioning method for generating a position error signal by using a recording medium in which at least a pair of burst patterns are recorded on each of a plurality of tracks, and a burst pattern read out from the recording medium, wherein a head is positioned using the position error signal, including measuring the amplitude of the burst pattern read out from the recording medium, detecting the defect of the burst pattern read out from the recording medium, measuring the maximum amplitude of the burst pattern pairing with the burst pattern having a defect detected when the defect is detected in the burst pattern, and generating a position error signal according to the amplitude and the maximum amplitude of the burst pattern pairing with the burst pattern having the defect detected.

The method for generating a position error signal of the present invention is a method for generating a position error signal by using a first burst pattern and a second burst pattern, including measuring the amplitude of the first burst pattern, determining whether the second burst pattern has a defect, and generating a position error signal from the amplitude of the first burst pattern and the maximum amplitude of the first burst pattern when it is determined that the second burst pattern has a defect.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The present invention is illustrated by way of example and not limitation in the figures of the accompanying drawings, in which like references indicate similar elements, and in which:

FIGS. 9(A)–(C) illustrates the use of the gray code of the magnetic disk;

FIG. 10 is a figure for explaining the case in which the servo is caused to perform a wrong correction operation by a wrong PES if there is a defect in a burst pattern.

DETAILED DESCRIPTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The disk device, track positioning method, and method for generating a position error signal related to the present invention can apply to a small-sized HDD on which a plurality of heads for performing a recording/reproducing to a recording medium is mounted.

Figure 1:
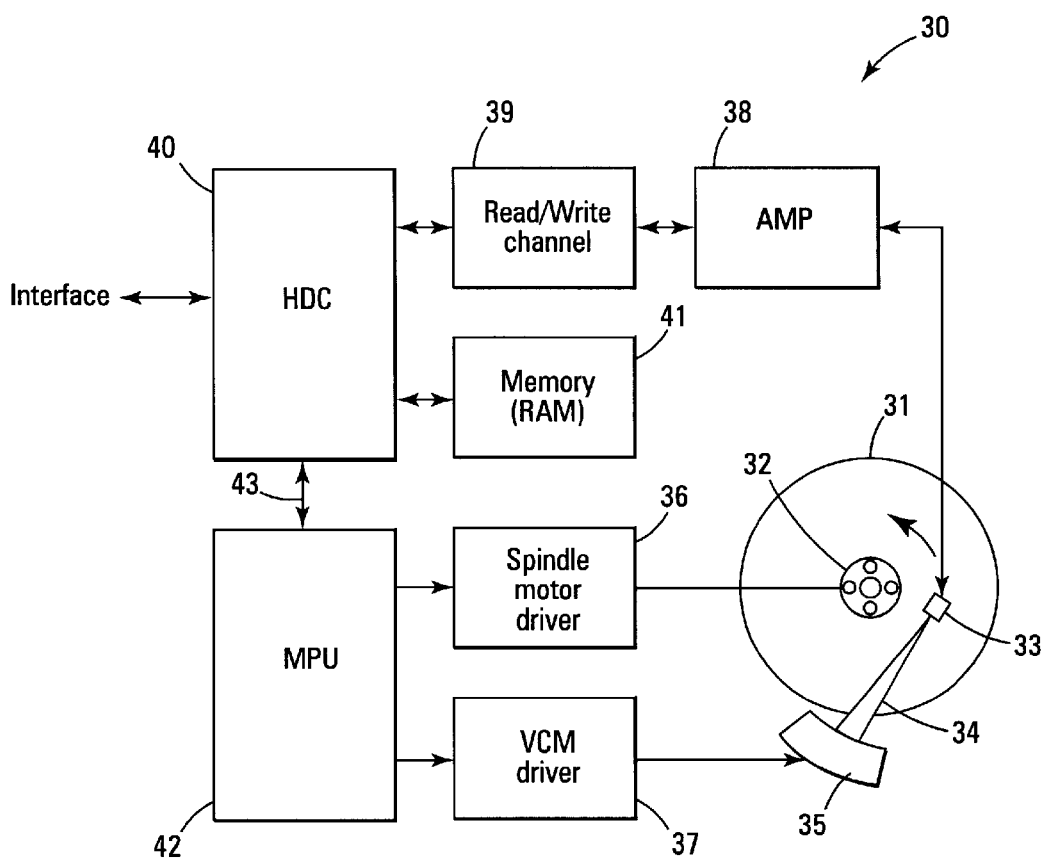
FIG. 1 is a block diagram showing the construction of the disk device related to an embodiment incorporating the present invention.

FIG. 1 is a block diagram showing the construction of the disk device related to an embodiment of the present invention. In FIG. 1, a disk device 30 includes a disk 31 such as a magnetic disk which is a data recording medium, a spindle motor 32 for rotationally driving the disk 31, a magnetic head 33 for performing a data read/write to the disk 31, an arm 34 supported on a rotary shaft (not shown) for free rotation for moving a head slider having the magnetic head 33 to over the surface of the disk 31 and to a refuge position, a voice coil motor (VCM) 35 for rotationally driving the arm 34, a spindle motor driver 36 for driving the spindle motor 32, a VCM driver 37 for driving the voice coil motor (VCM) 35, and an amplifier 38 for amplifying a detected signal and read/write data. A read/write channel module 39 is provided that includes a waveform shaping circuit. The disk device 30 also includes an analog-to-digital converter (ADC), a digital-to-analog converter (DAC) in modules, a hard disk controller (HDC) 40 for controlling a data read/write operation or the like to the magnetic disk, a memory 41 connected to the HDC 40 and used as a sector buffer memory for temporarily storing data for reading/writing, an MPU 42 which controls the operation of the whole HDD including the control over the HDC 40, and if a read/write error due to the defect of a burst pattern is found in a servo sector, creates a PES by using only the remaining burst patterns without using the burst pattern having the defect.

On the surface of the disk 31, tracks containing data areas in which data is recorded and servo areas in which servo data is prerecorded are concentrically arranged. One or a plurality of disks 31 is mounted.

The HDC 40 is connected to the MPU 42 via a control bus 43, and connected to an external host or the like via a predetermined interface. The MPU 42 is a microprocessor for executing a control program, and includes a memory or the like for storing the control program and data. The MPU 42 executes a process according to the control program to control the operation of the whole HDD, and controls the operation of the HDC 40 according to a command and control data supplied from the host. Specifically, the MPU 42 detects a read/write error due to the defect of a burst pattern in a servo sector, as described later, and executes a control for creating a PES by using only the remaining burst patterns without using the burst pattern having the defect.

Now, description is made to the method for creating a PES of the disk 30 constructed as described above. First, the basic concept of the present invention is described. In the HDD using sector servo, a defective sector occurs if there is a defect in the burst pattern for creating a PES which is position information of a servo. The defective sector is reassigned to a different place and written there. However, since the number of sectors that may be reassigned is limited and a seek operation must be performed, the performance of the HDD degrades.

Accordingly, in the present invention, if a read/write error due to the defect of a burst pattern is found in a certain servo sector, a PES is created using only the remaining burst patterns without using the burst pattern having the defect to prevent the occurrence of a wrong correction operation and hence to decrease defective sectors. That is, not only is defective burst data no longer used, but also position information is obtained from another measured burst data to perform a servo operation. In particular, a PES is created using only the remaining burst patterns without using the defective burst pattern. This allows the reduction of reassign sectors to prevent the performance degradation.

Figure 2:
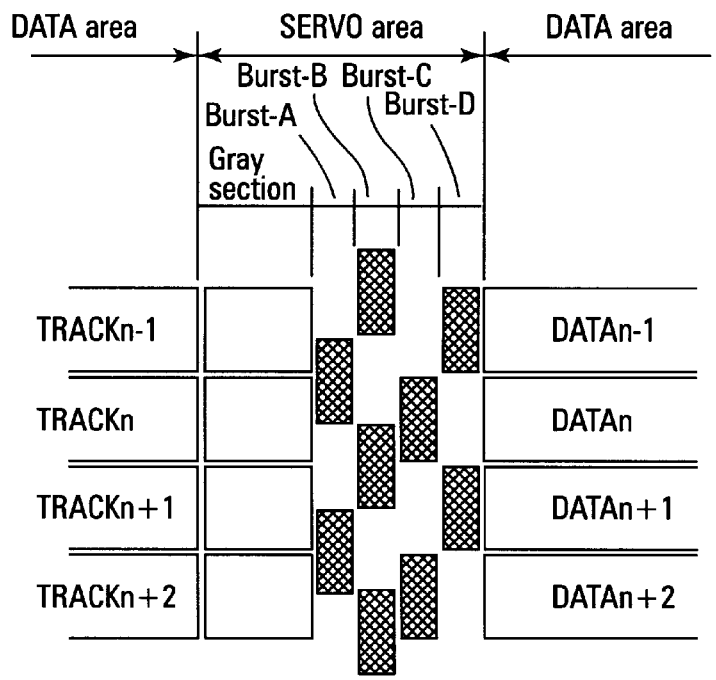
FIG. 2 is a figure showing an example of the servo pattern of the above disk device.
Figure 3:
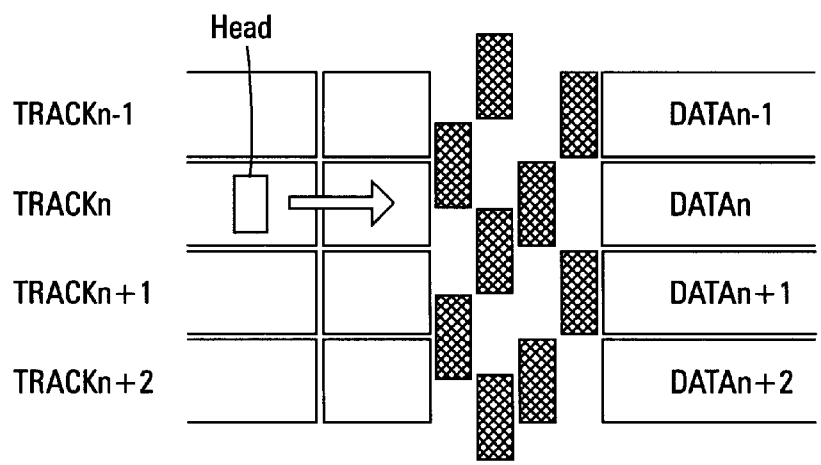
FIG. 3 is a figure showing an example of the servo pattern of the above disk device.
Figure 4:
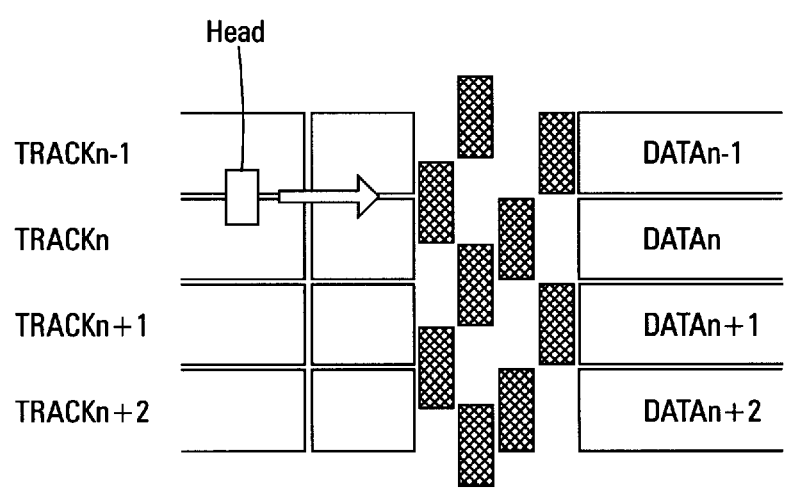
FIG. 4 is a figure showing an example of the servo pattern of the above disk device.

Based on the above basic concept, the method for creating a PES of the disk device is described below in detail. FIGS. 2 to 4 are figures showing an example of the servo pattern recorded on the magnetic disk, in which FIG. 2 is a figure showing the servo areas in detail, and FIGS. 3 and 4 are figures for explaining the operation for the occurrence of an error.

In FIG. 2, a plurality of tracks TRACKn−1, TRACKn, TRACKn+1, and TRACKn+2 in which data is recorded is concentrically formed in the magnetic disk, and in the tracks TRACKn−1, TRACKn, TRACKn+1, and TRACKn+2, data tracks DATAn−1, DATAn, DATAn+1, and DATAn+2 and servo areas are formed. A servo area consists of a gray section for creating a track ID, and a burst pattern for creating a PES (refer to the hatching). This example shows a case in which there are four burst patterns (burst A, burst B, burst C, and burst D).

A PES is obtained through a calculation performed for a combination of these burst patterns. By way of example, if it is assumed that the amplitudes of the burst A and the burst B are A and B, respectively, and that the PES obtained by the amplitudes A and B is MPES, then MPES is represented by the following equation (1):

$$MPES = \frac{A}{A+B} \quad (1)$$

Then, if the maximum values obtained when the head passes in the vicinity of the center of the respective burst patterns are assumed to be $A_{max}$ for the amplitude A and $B_{max}$ for the amplitude B, the relation shown by the following equation (2) is obtained.

$$A+B=A_{max}=B_{max} \quad (2)$$

Thus, the above equation (1) can be defined as shown by equation (3) according to the equation (2).

$$MPES = \frac{A}{A+B} = \frac{A}{A_{max}} = \frac{B_{max} - B}{B_{max}} \quad (3)$$

Similarly, if it is assumed that the amplitudes of the burst C and the burst D are C and D, respectively, the PES obtained from the amplitudes C and D is SPES, and the maximum value of the amplitude C is $C_{max}$ and the maximum value of the amplitude D is $D_{max}$, then SPES is shown by the following equation (4):

$$SPES = \frac{C}{C+D} = \frac{C}{C_{max}} = \frac{D_{max} - D}{D_{max}} \quad (4)$$

Even if any of the burst patterns (burst A, burst B, burst C, burst D) is defective, MPES and SPES can be calculated from the above equations (3) and (4) without using the defective burst pattern.

The following shows a processing for the case in which an error actually occurs. First, it is needed to find a defective burst pattern. By way of example, it is considered that, if the amplitude of a burst pattern exceeds a certain criterion when it is compared with the amplitude of the burst pattern of the preceding servo, it is determined that the particular burst portion is defective.

Figure 5:
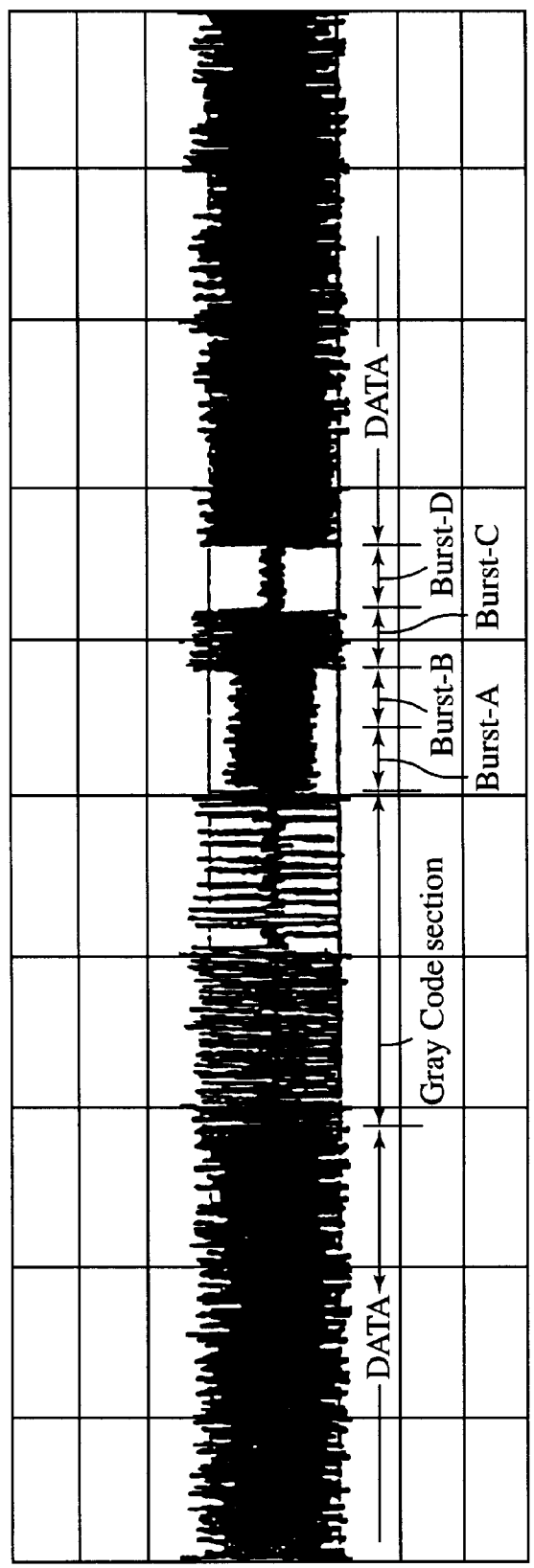
FIG. 5 is a figure showing the amplitude waveform of a reproduction signal from the magnetic head of the above disk device.
Figure 6:
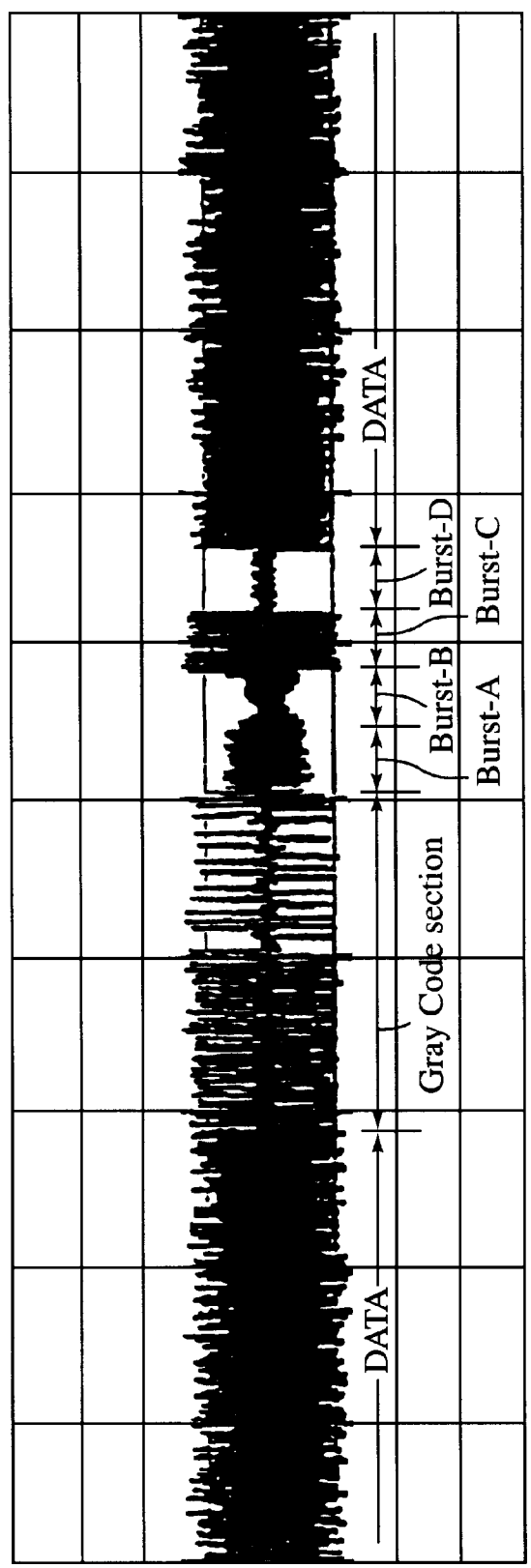
FIG. 6 is a figure showing the amplitude waveform of a reproduction signal from the magnetic head of the above disk device.
Figure 7:
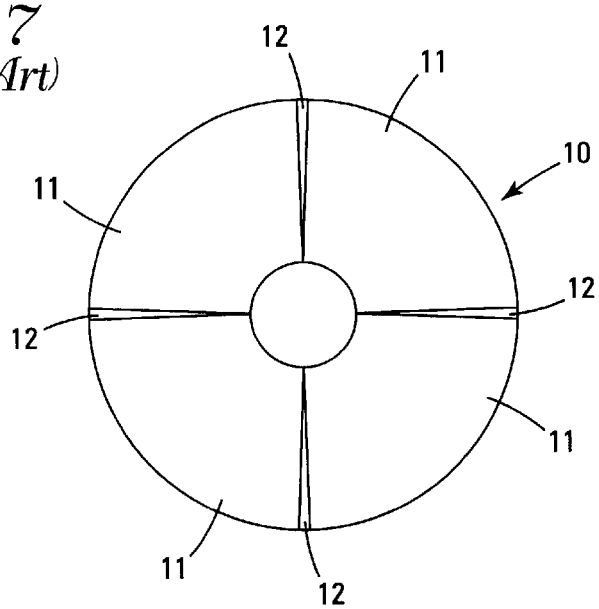
FIG. 7 is a figure schematically showing the data areas and servo areas of a magnetic disk.
Figure 8:
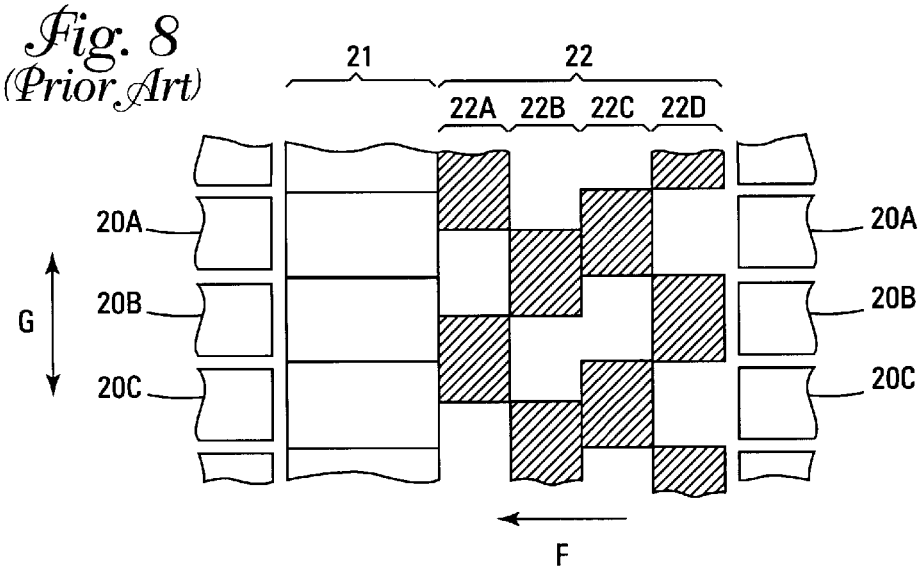
FIG. 8 is a figure showing part of the head position identifying information and burst patterns recorded on the magnetic disk.

FIGS. 5 and 6 are figures showing the amplitude waveforms of the reproduction signals from the magnetic head when the magnetic head moves above the servo area. Moreover, FIG. 5 shows the signal waveform for the case in which there is no defect in a burst pattern. FIG. 6 shows the signal waveform for the case in which there is a defect.

For instance, if there is a defect in the burst pattern B in the above FIG. 2, a large difference occurs in the amplitude levels of the reproduction signals, as apparent from the comparison of the amplitudes of the burst B in FIGS. 5 and 6 (the amplitude is smaller in FIG. 6). Thus, the amplitude of a burst pattern is compared with the amplitude of the burst pattern in the preceding servo, and if the comparison result exceeds a predetermined criterion, it can be determined that the particular burst portion is defective.

Then, a PES is created using only the remaining burst patterns, without using the defective burst pattern detected as described above. That is, the sum of the signals of a plurality of burst patterns is analyzed to create a PES, and the signal of the defective burst pattern is removed from the sum of the burst pattern signals and a value corresponding to the sum is given by the maximum amplitude value of a burst pattern having no defect.

For instance, as described above, the sum (A+B) of the signals of the burst patterns A and B becomes the relation shown by the above equation (2), if the maximum values obtained when the head passes in the vicinity of the center of the respective burst patterns are assumed to be $A_{max}$ for the amplitude A and $B_{max}$ for the amplitude B, and MPES obtained by the amplitudes A and B is shown by the above equation (3). Accordingly, if there is a defect in the burst pattern B, it is only needed to measure the amplitude of the burst pattern A and its maximum value $A_{max}$ from the equation (3).

From the above viewpoint, the maximum amplitude values of the respective burst patterns A, B, C, and D are measured. They can be measured by causing the head to track the center of each burst pattern.

For instance, in FIG. 2, to obtain $C_{max}$ in TRACKn, it can be measured by causing the head to track in the vicinity of the center of TRACKn, as shown in FIG. 3. Further, for TRACKn+1, it can be measured by causing the head to track in the vicinity of the center of +/−1 TRACK. Further, to obtain $A_{max}$ in TRACKn, it can be measured by causing the head to track in the vicinity of the boundary between TRACKn−1 and TRACKn, as shown in FIG. 4. $B_{max}$ and $D_{max}$, can be obtained in a similar manner.

The foregoing may be summarized as follows. If a read/write error occurs, the error is examined to determine whether it is due to a change in PES. If it is an error due to a change in PES, a servo portion in which the PES or the amplitude of each burst largely varies as compared with the value of the preceding servo is detected to identify a defective burst pattern. For the application of the above equation (3) or (4), the maximum amplitude of the necessary burst is measured while changing the tracking position of the head, and the maximum amplitude is stored in the memory 41 or the like. For a read/write, the head is caused to track a target track, and the value of the maximum amplitude measured in the above (3) in the servo of the defective burst is used to calculate MPES and SPES, by which a PES is created.

Figure 11:
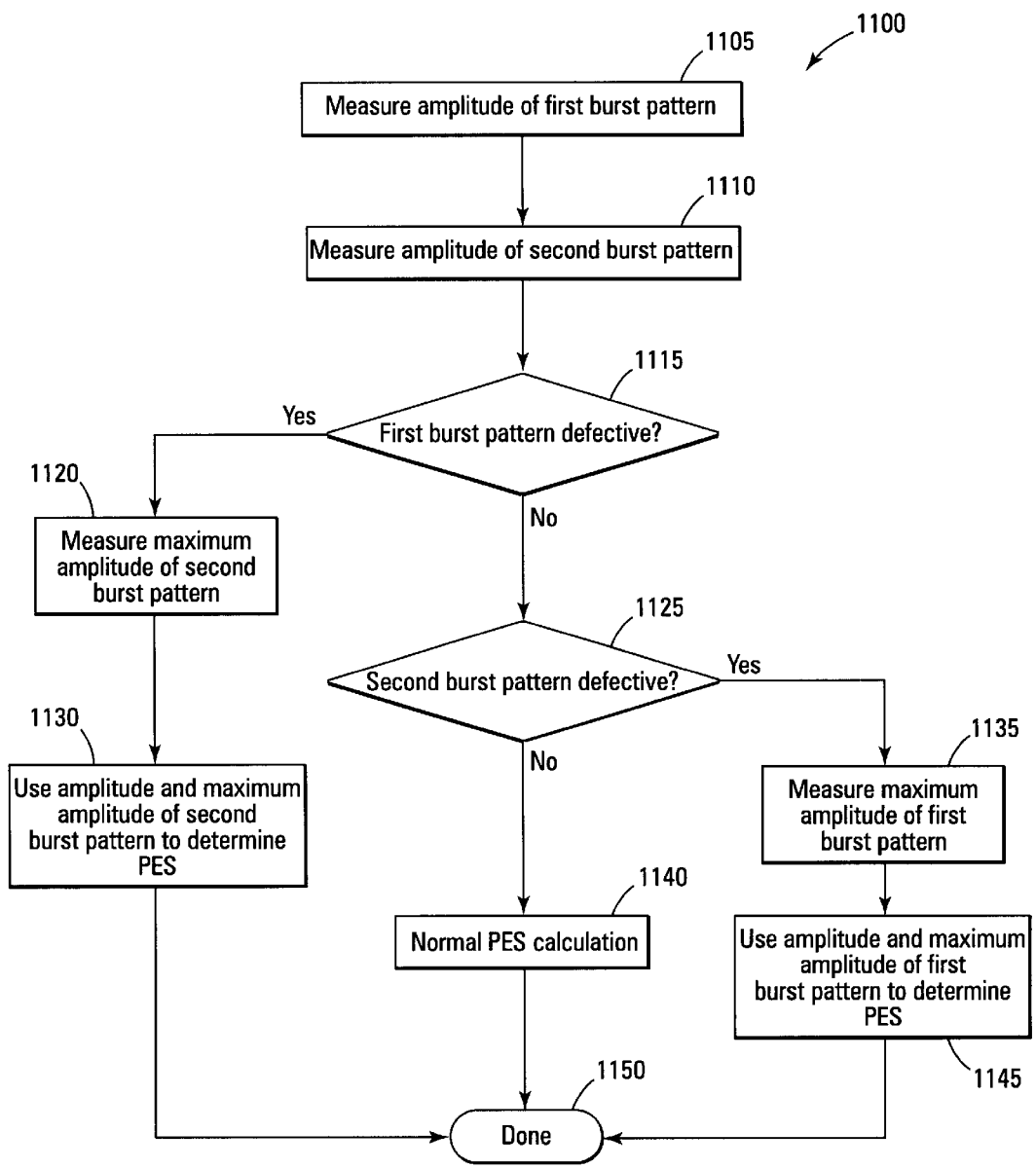
FIG. 11 is a flow diagram illustrating a PES calculation according to the present invention.

FIG. 11 illustrates a PES calculation according to the present invention. Amplitudes of first and second burst patterns, burst pattern A and burst pattern B for example, are measured in 1105 and 1110. If the first burst pattern is found to be defective in 1115, as discussed above, the maximum amplitude of the second burst pattern is measured in 1120. The amplitude and the maximum amplitude of the second burst pattern is then used to calculate the PES in 1130 according to equation (3). If the first burst pattern is not defective, but the second burst pattern is found to be defective in 1125, then the maximum amplitude of the first burst pattern is measured in 1135. The amplitude and the maximum amplitude of the first burst pattern is then used to calculate the PES in 1145 according to equation (3). If both burst patterns are non-defective, then the PES is calculated in 1140 according to equation (1). The PES calculation terminates at 1150.

As described above, in the disk device and track positioning method related to this embodiment, the defect of a burst pattern read out from a disk is detected, and when a defect is detected in the burst pattern, a data value corresponding to the sum data of the burst pattern pair having the defect detected is obtained by measuring the maximum amplitude value of the burst pattern pairing with the burst pattern having the defect detected, and a PES is generated according to the amplitude of the burst pattern having the defect detected and the maximum amplitude value, so that the PES is created using actually measured values and the PES has reliability as compared with a technique using a dummy PES as if there is no change in speed and position, as in the background art. Accordingly, there is no possibility of reading wrong data, or performing an off-track data write to destroy the data in the adjacent track.

Accordingly, by applying the disk device and track positioning method having the above described features, for instance, to a HDD, the number of sectors that need to reassigned can be decreased through the decrease of defective sectors even if there is a defect in the burst pattern for creating a PES, wherein seek operations contributing to the performance reduction of the HDD can be reduced as much as possible.

Further, although an example in which the present invention is applied to the HDD has been described in this embodiment, this means no limitation and the present invention can be applied to any disk device and track positioning method in which flagging is made to defects occurring in burst patterns in the servo areas of a recording medium. For instance, it may be used in an external storage device other than the HDD, such as a magnetic tape unit, and an advantage similar to the above embodiment can be obtained.

Furthermore, although the description has been made to an example using four burst patterns in this embodiment, any form may be employed in which a PES is created using burst patterns, and there is no limitation on the number of patterns, the combination of them, how to create the PES, etc. In this case, it is only needed that each of a plurality of tracks has at least a pair of burst patterns, and, for instance, it is to be understood that a form using only the burst patterns A and B in the above embodiment is also allowed. In addition, "a pair of burst patterns" means that burst patterns are used in combination, and, for instance, in the above embodiment, a combination of the burst patterns A, B, and C (the burst pattern D is omitted) is allowed. Moreover, it is needless to say that the types and number of the MPU, HDC and the like which are forming the above disk device are not limited to the above described embodiment.

In summary, a disk device, track positioning method, and method for generating a position error signal related to the present invention includes a defect detector for detecting the defect of a burst pattern read out from a disk, and PES generator, for generating a position error signal by using a burst pattern other than the burst pattern having the defect detected when a defect is detected in the burst pattern by the defect detector is described. Accordingly, a wrong correction operation can be prevented from being caused without using the defective burst pattern, and the number of sectors that need to be reassigned can be decreased by decreasing the number of defective sectors to reduce the performance degradation.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A disk device in which a position error signal is generated using burst patterns read out from a disk in which at least a pair of burst patterns are recorded on each of a plurality of tracks, and a head is positioned at a desired track according to said position error signal, said disk device comprising:

a head disk controller for controlling said disk; and an MPU, coupled to the head disk controller, for detecting a burst pattern for generating a position error signal, the MPU further detecting a defect in one burst pattern of a burst pattern pair from said disk and for generating said position error signal by using a burst pattern of the burst pattern pair without a defect.

2. A disk device as set forth in claim 1, wherein, when a defect is detected in said burst pattern by said MPU, a data value corresponding to a sum data of a burst pattern pair having said defect detected is obtained by measuring the maximum amplitude value of the burst pattern pairing with the burst pattern having said defect detected, and said position error signal is generated according to said maximum amplitude value.

3. A disk device as set forth in claim 1, wherein said MPU compares the amplitude of a burst pattern with the amplitude of a corresponding preceding burst pattern, and detects the defect of the burst pattern according to the comparison result.

4. A disk device as set forth in claim 1, wherein a maximum amplitude value is a value obtained when the head passes in the vicinity of the center of the burst pattern.

5. A disk device as set forth in claim 1, further comprising a driver that drives the head on the disk, wherein a maximum amplitude value is measured by causing the head to track the center of the burst pattern.

6. A disk device as set forth in claim 1, wherein, after the detection of the defect in one of a burst pattern pair of the burst pattern, a position error signal is generated according to the amplitude of a burst pattern detected by the MPU other than the burst pattern having the defect detected by the MPU, and the measured maximum amplitude value of the other burst pattern without a defect.

7. A disk device in which a position error signal is generated using burst patterns read out from a disk in which at least a pair of burst patterns are recorded on each of a plurality of tracks, and a head is positioned at a desired track according to said position error signal, said disk device comprising:

a head disk controller for controlling said disk; and an MPU, coupled to the head disk controller, for detecting a burst pattern for generating a position error signal, the MPU further detecting a defect in one burst pattern of a burst pattern pair from said disk, for measuring the maximum amplitude value of a burst pattern other than the burst pattern having said defect detected and for generating said position error signal by using a burst pattern of the burst pattern pair without a defect.

8. A disk device as set forth in claim 7, wherein, when a defect is detected in said burst pattern by said MPU, a data value corresponding to a sum data of a burst pattern pair having said defect detected is obtained by measuring the maximum amplitude value of the burst pattern pairing with the burst pattern having said defect detected, and said position error signal is generated according to said maximum amplitude value.

9. A disk device as set forth in claim 7, wherein said MPU compares the amplitude of a burst pattern with the amplitude of a corresponding preceding burst pattern, and detects the defect of the burst pattern according to the comparison result.

10. A disk device as set forth in claim 7, wherein said maximum amplitude value is a value obtained when the head passes in the vicinity of the center of the burst pattern.

11. A disk device as set forth in claim 7, further comprising a driver that drives the head on the disk, wherein the maximum amplitude value is measured by causing the head to track the center of the burst pattern.

12. A disk device as set forth in claim 7, wherein, after the detection of the defect of the burst pattern, a position error signal is generated according to the amplitude of a burst pattern detected by the MPU other than the burst pattern having the defect, detected by the MPU, and the measured maximum amplitude value of the other than the burst pattern having the defect.

13. A disk device in which a position error signal is generated using burst patterns read out from a disk in which at least a pair of burst patterns are recorded on each of a plurality of tracks, and a head is positioned at a desired track according to said position error signal, said disk device comprising:

a head disk controller for controlling a disk; and an MPU, coupled to the head disk controller, for detecting a burst pattern for generating a position error signal, the MPU further detecting a defect in one burst pattern of a burst pattern pair from said disk and for generating said position error signal by using a burst pattern of the burst pattern pair without a defect.

14. A disk device as set forth in claim 13, wherein, when a defect is detected in said burst pattern by said MPU, a data value corresponding to the sum data of the burst pattern pair having said defect detected is obtained by measuring a maximum amplitude value of the burst pattern pairing with the burst pattern having said defect detected, and said position error signal is generated according to said maximum amplitude value.

15. A disk device as set forth in claim 13, wherein said MPU compares the amplitude of a burst pattern with the amplitude of a corresponding preceding burst pattern, and detects the defect of the burst pattern according to the comparison result.

16. A disk device as set forth in claim 13, wherein said maximum amplitude value is a value obtained when the head passes in the vicinity of the center of the burst pattern.

17. A disk device as set forth in claim 13, further comprising a driver that drives the head on the disk, wherein the maximum amplitude value is measured by causing the head to track the center of the burst pattern.

18. A disk device as set forth in claim 13, wherein, after detection of the defect of the burst pattern, a position error signal is generated according to the amplitude of a burst pattern detected by the MPU other than the burst pattern having the defect detected by the MPU, and the measured maximum amplitude value of the other than the burst pattern having the defect.

19. A track positioning method for generating a position error signal by using burst patterns read out from a recording medium in which at least a pair of burst patterns are recorded on each of a plurality of tracks, and positioning a head by using said position error signal, said method comprising:

measuring amplitudes of first and second burst patterns read out from said recording medium;

detecting a defect of said first burst pattern;

measuring the maximum amplitude of said second burst pattern; and generating said position error signal using said amplitude of said second burst pattern and said maximum amplitude of said second burst pattern.

20. A method for generating a position error signal by using a first burst pattern and a second burst pattern, said method comprising:

measuring the amplitude of the first burst pattern;

determining whether the second burst pattern has a defect; and generating a position error signal from the amplitude of said first burst pattern and the maximum amplitude of said first burst pattern when it is determined that said second burst pattern has a defect.

* * * * *